United States Patent Office 2,791,643
Patented May 7, 1957

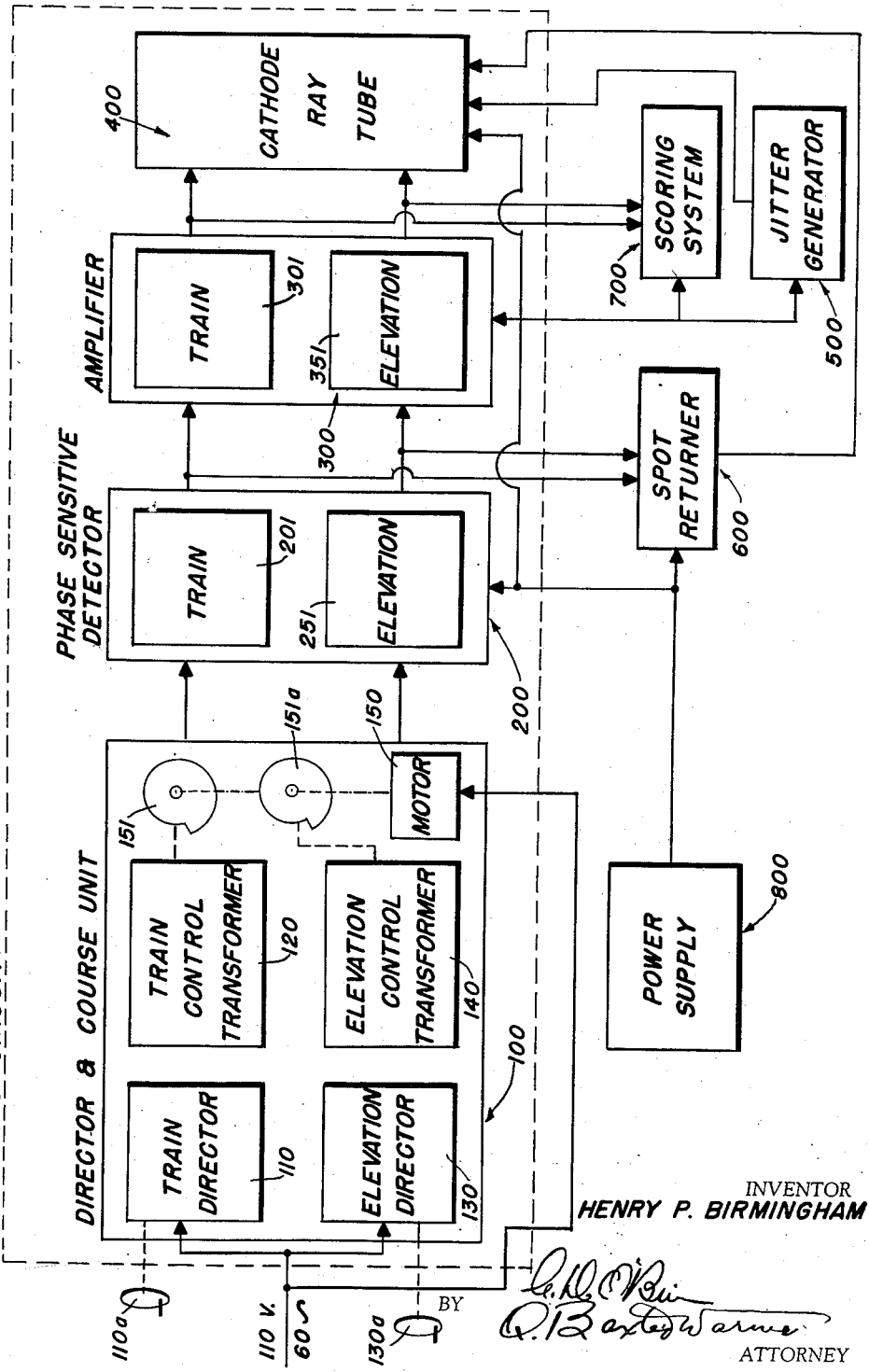

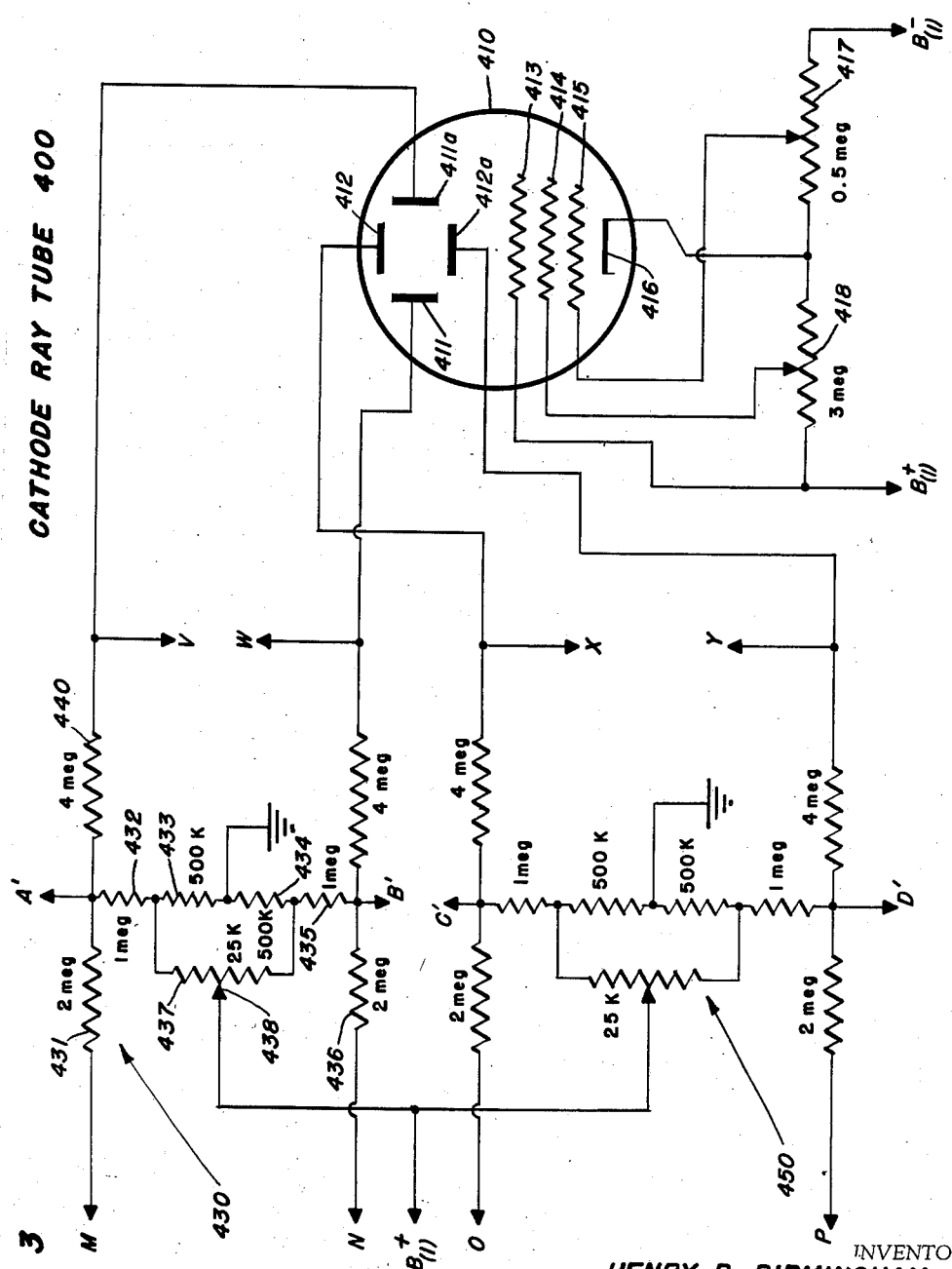

2,791,643

DIFFERENTIAL AMPLIFIER IN A RADAR TRACKING DEMONSTRATING AND TRAINING INSTRUMENT

Henry P. Birmingham, Washington, D. C., assignor, by mesne assignments, to the United States of America as represented by the Secretary of the Navy Original application May 11, 1951, Serial No. 225,768. Divided and this application June 30, 1952, Serial No. 296,335

1 Claim. (Cl. 179—171)

The present invention relates generally to an amplifier for an instrument for training personnel in the art of radar tracking and for demonstrating the operation of radar tracking instruments, and is a division of application Serial No. 225,768, filed May 11, 1951, and related to application Serial No. 296,336, filed June 30, 1952. The instrument is so designed as to closely simulate the operation of an actual train-elevation tracking radarscope, both in the results obtained therefrom and in the operation thereof.

In its general aspects, the instrument embodying the amplifier of the present invention is designed to operate in conjunction with a cathode ray tube whose screen is caused to simulate functionally the screen of an actual train-elevation tracking radarscope. A target tracking circuit is provided which enables a trainee to track an imaginary target pursuing an imaginary course through visual observation of a cathode ray beam spot on the cathode ray tube screen (as in actual train-elevation tracking radarscopes), through the manipulation of train and elevation controls such as dials or the like. The course of an imaginary target is fed into the cathode ray tube as an electrical signal, varying in accordance with a desired course pattern, to impress varying tracking signals across the two pairs of cathode ray beam deflecting plates of the cathode ray tube and to cause a vertical and/or horizontal deflection of the cathode ray beam spot on the cathode ray tube screen, representing the resultant of the train and/or elevation components of a desired target course. Proper manipulation of the control dials by the trainee results in a decrease in the signals thus applied across the beam deflecting plates to decrease the deflection of the cathode ray beam spot. Thus, the imaginary course of an imaginary target is represented by a deflection of the cathode ray beam or target tracking spot, while the trainee attempts to track the imaginary target along its course by manipulation of the control dials to maintain the spot at or close to its zero deflection point.

The aforementioned instrument is also provided with a jitter generator unit, which produces relatively small varying and vibrating signals across the cathode ray beam deflecting plates, to impress a slight wander motion on the target tracking spot and to superimpose a vibratory or jitter action upon this wander path, thus affording a realistic simulation of the actual appearance of the type of radarscope screen being imitated. In the use of an actual radarscope of the type here concerned, if the target leaves the scope's tracking field, or if the tracking is so inaccurate as to permit the target to pass out of the scope's field, the scope attains an "off-target" condition wherein the tracking spot immediate attains a substantially annular form which wanders into a substantially central position on the screen. The "off-target" condition continues until the field of the radarscope is again placed "on-target," whereupon the tracking spot is again formed on the screen and the usual tracking operation may be continued. Therefore, to further simulate actual radarscope operation, the instrument is provided with a spot returner unit operating to convert the tracking spot into a substantially annular form when the tracking spot, representing the imaginary target, passes outside an "on-target" area defined on the cathode ray tube screen, and further operates to cause the annular form to generally wander toward a central position on the cathode ray tube screen. A caging mechanism is also provided in the instrument for operation in conjunction with the spot returner unit, and functions to enable a return to "on-target" condition after the "off-target" condition has occurred.

In order to determine the proficiency of a trainee in tracking an imaginary target, the instrument is provided with a scoring system, which operates to define an accurate tracking area on the cathode ray tube screen. So long as the trainee is tracking the imaginary target with sufficient accuracy to keep the tracking spot within the accurate tracking area so defined, the scoring system registers accurate tracking; while if the tracking error is so great as to cause the tracking spot to exceed the limits of said area, the scoring system stops registering. Thus, there is provided a determination of the portion of the tracking time during which accurate tracking was obtained.

It is therefore, one object of the present invention to provide an amplifier for an instrument for training in and demonstrating radar tracking which simulates the conditions of actual radar tracking in train and elevation and the operation of an actual train-elevation tracking radarscope.

Another object of the present invention is to provide a differential amplifier for an instrument for training and demonstrating radar tracking which enables a trainee to track an imaginary target along an imaginary target course in a manner similar to actual radar tracking.

Still another object of the present invention is to provide a differential amplifier which functions to decrease the potential in one output circuit thereof proportionately to the increase in potential of the other output circuit thereof in response to an input signal, and which operates in the tracking circuit of the aforementioned instrument to increase the tracking signal applied to one of a pair of the cathode ray beam deflecting plates and to proportionately decrease the signal applied to the other plate of the pair.

Another purpose of this invention is to provide an amplifier suitable for general utility, also suitable for utility as a differential amplifier and also especially suitable for incorporation in the circuitry of the instrument of the afore-mentioned application Serial No. 225,768 in the manner described therein.

Other objects and many of the attendant advantages of this invention will be readily appreciated as the same becomes better understood by reference to the following detailed description when considered in connection with the accompanying drawings and wherein:

Fig. 1 is a schematic block diagram of the several components of the instrument of the afore-mentioned application Serial No. 225,768 and schematically illustrates their interrelation;

Fig. 2 is a schematic diagram of a preferred embodiment of the amplifier of the present invention; and Fig. 3 is a schematic representation of the cathode ray tube unit of Fig. 1 which may electrically follow the amplifier circuit of Fig. 2.

Tracking circuit

The tracking circuit of the present instrument in general comprises a director and course unit 100, whose output is fed into a phase sensitive detector 200, the output of which is amplified in the amplifier 300 and then fed to the beam deflecting plates of the cathode ray tube 400, as illustrated in the block diagram Fig. 1. This circuit is made up of two substantially identical systems, one for tracking in train and the other for tracking in elevation, the resultant output of each being applied to a different pair of cathode ray tube beam deflecting plates. The director and course unit 100 comprises two pairs of synchronously connected generators connected to form two control transformer systems, one pair including the train director 110 and the train control transformer 120, while the other pair includes the elevation director 130 and the elevation control transformer 140. Train course cam 151 and elevation course cam 151a and their operating motor 150 are included in the director and course unit. These cams are mechanically connected to the rotors of the train and elevation control transformers 120 and 140 respectively, and operate to establish an imaginary target course for the trainee to track. As these cams are driven by the motor, desired rotational patterns of the control transformer rotors are obtained in accordance with the contours of the cams, and as the rotors are moved out of synchronous relationship with the positions of the rotors in their respective director units 110 and 130, separate train and elevation signals are generated in accordance with the nonsynchronous displacement of each of the control transformer rotors with respect to its corresponding director rotor. The signals thus generated are fed into the phase sensitive detector 200, the train signal being fed into the train portion 201 of the detector and the elevation signal into the elevation portion 251, where the phase of the signals generated by the director and course unit are determined to establish the direction of nonsynchronous displacement between the corresponding directors and control transformers. The train output of the phase sensitive detector is then amplified in the train portion 301 of amplifier 300, and the elevation output is amplified in the elevation portion 351 thereof before being applied to their respective pairs of cathode ray tube beam deflecting plates. A cathode ray beam spot or visual tracking reference on the cathode ray tube screen is thus deflected from an established central position or null point in accordance with the nonsynchronous displacement of the train and elevation control transformer rotors with respect to their corresponding director rotors and the signals resulting therefrom. The trainee observes the deflection of the spot on the cathode ray tube screen, representing a target course, and attempts to follow this course by keeping the spot in the central portion of a reticle or area defined on the cathode ray tube screen. This tracking is accomplished by the trainee manipulating train and elevation control dials 110a and 130a or other control means to rotate the train and elevation director rotors, respectively. Proper manipulation of these dials operates to rotate the director rotors into synchronous position with the displaced control transformer rotors, thereby reducing the director course unit output signal, and hence reducing the deflection of the spot or reference on the cathode ray tube screen. Thus, as an imaginary target course is described by the action of the course cams and their motor on the control transformer rotors and is observed by the position of the spot on the cathode ray tube screen, the trainee attempts to maintain an "on-target" positioned by manipulation of the train and elevation control dials to cause the train and elevation director rotors to follow this course.

As described in aforementioned application Serial No. 225,768 of which the present application is a division, upon occurrence of a train tracking error, a pulsating intermittent D. C. potential difference is created between points I and J, whose magnitude is dependent upon the magnitude of train tracking error up to a maximum limit established by the characteristics of a limiter tube and circuit associated with phase sensitive detector 200, in a direction determined by the direction of the train tracking error and established by operation of a phase detector tube and circuit in phase sensitive detector 200, and this signal is applied across input points I and J of the amplifier of the present invention. The elevation portion of the phase sensitive detector is identical to the train portion and upon application of an elevation tracking error signal, a potential difference is created in a similar manner across input points K and L of the amplifier of the present invention.

The intermittent pulsating voltage outputs of the phase sensitive detector unit at points I, J, K, and L are applied to the amplifier 300 through its input bridges 240 and 241, shown in Fig. 2. Considering in detail the train portion of the amplifier, it comprises the twin triode amplifier tube 310, having the cathodes 311 and 311a, the grids 312 and 313, the plates 314 and 315, and the cathode load resistor 316. The B−(1) supply is connected to the cathodes 311 and 311a through the cathode load resistor 316, to the grids 312 and 313 through the resistors 290 and 291, and to points I and J and the plates 233 and 235 of detector tube 230 (see Fig. 3 of afore-mentioned application Serial No. 225,768) through the amplifier input bridge 240, although having a negligible effect on the latter because of the large impedance of the bridge 240, while the B+(1) supply is connected to the plates 314 and 315 through the plate load resistors 317, 318, and 319. The values of the B supplies and of the elements of this circuit are so chosen as to establish the cathodes 311 and 311a at approximately ground potential and at a positive potential with respect to the grids 312 and 313, and to establish the tube 310 with a desired flow of electrons from its cathodes 311 and 311a to its plates 314 and 315 respectively. Upon the occurrence of a train tracking error, the potential difference resulting between points I and J from the operation of the phase detector tube of the phase sensitive detector is applied across amplifier tube grids 312 and 313, after being smoothed into a substantially steady D. C. potential by means of the filters comprising resistor 280 and condenser 284 connected to ground and resistor 282 and condenser 285 connected to ground. Upon the occurrence of a negative potential shift at point I and a positive shift at point J as a result of a train tracking error, the potential on grid 312 of the tube 310 is correspondingly shifted in negative direction to decrease the electron flow from cathode 311 to plate 314 while grid 313 is correspondingly shifted in a positive direction but by a less amount than the shift of grid 312 (because the potential shifts at points I and J are not of equal magnitude) to increase current flow from cathode 311a to plate 315. The amplifier tube 310 being connected to function as the cathode follower, the potential on the connected cathodes 311 and 311a is accordingly shifted in a negative direction resulting in a greater flow of electrons from the cathode 311a to the plate 315 of tube 310 than would result solely from the positive potential shift of grid 313. The potential on plate 315 and at point N therefore shifts in a negative direction while that on plate 314 and at point M correspondingly shifts in more positive direction. If the train tracking error is in such direction as to result in negative increase of potential at point J and a positive increase at point I, it is therefore apparent from the foregoing analysis that the potential on plate 314 and at point M shifts in a negative direction and that on plate 315 and at point N correspondingly shifts in a positive direction. This amplifier, therefore, functions substantially as a true differential amplifier when the impedance for each half of its output bridge comprising resistors 318 and 319 are equal, causing substantially equal but inverse variations in its two plate potentials for a signal applied to one of its control grids. The condensers 292 and 293 connected across the resistors 290 and 291, respectively, function to further steady the linearity of the voltages applied to the cathodes and grids of tube 310.

If desired, either of the condensers 286 or 287 of different capacitance values may be connected across the amplifier tube feed-in bridge 240 through a resistor 288 and the selector switch 289, cooperating with resistors 281 or 283 to damp partially variations in the potential difference between points I and J or to damp partially the effect of variations in train tracking error. When the values for condensers 286 and 287 and resistors 288 and 281 or 283 are properly chosen, a desired fraction of potential difference change between points I and J is damped, thereby resulting in the simulation of automatic lead of the target as is frequently employed in gun director systems. As the trainee adjusts the train director to compensate for movement of the target and eliminate a tracking error signal, the initial potential difference change between points I and J are damped and no noticeable effect is had on the cathode ray tube screen, corresponding to the lag of the gun director with respect to the gun to provide the lead angle. Variations in rate of manipulations of the train director 110 are correspondingly affected to simulate the effect of automatic lead angle.

The elevation portion of the amplifier circuit is identical to the above-described train portion, comprising the twin triode amplifier tube 330, an input bridge 241 therefor, and an output bridge therefor. The elevation portion of this circuit thus functions in a manner identical to the train portion, so that the application of a negative potential at point K with respect to point L resulting from elevation tracking error and the operation of the phase detector tube of the elevation section of the phase sensitive detector causes the potential at point P to shift in a negative direction and that at point O to shift in a positive direction, while the application of negative potential at point L with respect to point K causes the potential at point O to shift in a positive direction. Amplifier tube 330, therefore, also functions as a differential amplifier in the same manner as tube 310. Thus, upon the occurrence of a tracking error either in train or elevation, the direction of the error is established by the phase sensitive detector circuit, and the error signal issuing from the detector is then amplified in the amplifier circuit to establish a potential difference between points M and N for train tracking error and points O and P for elevation tracking error, the direction of the potential difference in each case depending upon the direction of tracking error of the respective tracking phase.

The cathode ray tube unit 400, shown in detail in Fig. 3, like the above-described units of the tracking circuit, is divided into two identical parts: the train error signal portion, including the horizontal beam deflecting plates 411 and 411a of the cathode ray tube 410, and the elevation error signal portion, including the vertical beam deflecting plates 412 and 412a of the cathode ray tube. Considering the cathode ray tube train input bridge 430 in detail, it comprises the resistor 431 connected to point M, resistors 432, 433, 434, and 435, and the resistor 436 connected to point N. The points M and N are established at a desired potential level as determined by the zero train tracking error output of the amplifier tube 310, thus establishing the horizontal beam deflecting plates 411 and 411a at substantially equal and determined potential levels. However, if due to a slight unbalance in the input bridge 430 the potential thus established on the horizontal beam deflecting plates 411 and 411a are not equal, this inequality may be overcome by the application of the B+(1) potential to the subsidiary bridge comprising the resistors 437, 433, and 434 through the variable tap 438 on resistor 437, to establish the cathode ray beam spot at the horizontal center of the tracking reticle on the cathode ray tube screen, which operation will be described subsequently. Upon the occurrence of a potential difference between points M and N, as would result from an error in train tracking, the error is indicated on the cathode ray tube screen by a corresponding horizontal deflection of the cathode ray beam or target tracking spot from its horizontal null point, resulting from the unequal potentials impressed upon the horizontal beam deflecting plates. Thus, any error in train tracking is represented by a horizontal deflection of the cathode ray beam spot on the cathode ray tube screen, with the direction of error as established by the phase sensitive detector unit determining the direction of the deflection. The elevation cathode ray tube input bridge 450 and its subsidiary zeroing bridge are identical to the train input and subsidiary bridges, and operate in a corresponding manner upon the vertical beam deflecting plates 412 and 412a of the cathode ray tube, to indicate the elevation tracking error by a vertical deflection of the cathode ray beam spot in a direction corresponding to the tracking error direction established by the elevation tracking error signal impressed upon the elevation input bridge 450 at points O and P. The operating potentials on the anode 413, the cathode 416, and the focus and intensity grids 414 and 415 respectively, of the cathode ray tube are established by the B−(1) and B+(1) potential sources applied across the resistors 417 and 418.

In order to effect a proper zeroing of the cathode ray beam spot in the tracking reticle on the cathode ray tube screen, the resistors 290 and 291 and plates 314 and 315 of tube 310 in the train portion of the tracking circuit and the corresponding elements in the elevation portion are shunted by closure of tied switches 294 and 295 and tied switches 320 and 321. Closure of the first mentioned pair of switches results in substantially equal potentials being applied to the grids of the two amplifier tubes, and closure of the second mentioned pair of switches insures substantially equal potentials at points M and N and at points O and P, despite any unbalance in operation of the amplifier tubes or inequality in their output bridges. This being done, the outputs of the subsidiary bridges in the cathode ray tube input circuits may be adjusted by their variable taps to position the cathode ray beam spot centrally, both vertically and horizontally, in the reticle on the cathode ray tube screen, placing the cathode ray tube circuit in readiness for operation in the tracking circuit.

Scoring system

In order to determine how effectively the trainee is tracking the imaginary target along its imaginary course, the present device is provided with a scoring system generally indicated by the numeral 700. As previously mentioned, the object in operating the present tracking circuit is to follow the imaginary course of a target as established by the course cam 151 and its motor 150 and as indicated by the cathode ray beam spot on the screen of the cathode tube 410, the tracking errors being indicated by appropriate deflections of this target tracking spot from its zero or central position within the reticle on the cathode ray tube screen. To determine the accuracy of the trainee's tracking over a period of time, the present scoring system energizes a scoring clock so long as the error signal delivered by the amplifier to the cathode ray tube deflecting plates is not great enough to cause a beam deflection beyond desired established limits within the reticle. To this end, the output voltages of the amplifier at points M and N for train O and P for elevation errors respectively, are applied to the scoring system circuit, voltages impressed at points M and N and at O and P being applied to the scoring system circuit to actuate that circuit to register a score whenever the combined train and elevation tracking errors exceed a predetermined amount.

The operation of this scoring system is described in aforementioned application Serial No. 225,768.

Spot returner unit

As indicated in preceding portions of the present specification, the trainee's proficiency in tracking the imaginary target is registered by the scoring system 700, operating to indicate the portion of a period of time in which the trainee followed the imaginary target within a given field of accuracy. However, when tracking errors exceed the limits so defined, no effect is had upon the tracking circuit, only the scoring clock being deenergized. In order to further simulate an actual train-elevation tracking radarscope, the present device is provided with a spot returner unit, generally indicated by the numeral 600, which defines an "on-target" area with relation to the cathode ray tube screen beyond the limits established by the scoring system. This unit operates in such a manner that when the combined train and elevation tracking errors cause the cathode ray beam spot on the cathode ray tube screen to be deflected beyond the limits defined by it, as corresponds to a tracking error which would put a radarscope "off-target," the spot on the cathode ray tube screen is caused to change into an annular form and to slowly wander generally in the direction of the center or null point of the tracking reticle.

The voltages carried by the tracking circuit amplifier input bridge at points R and S for train and points T and U for elevation are impressed on the spot returner circuit to actuate this unit as described in afore-mentioned application Serial No. 225,768.

Thus, the spot returner circuit operates to define a substantially square area upon the cathode ray tube screen outside the substantially octagonal area defined by the scoring system to delineate an "on-target" tracking area on the cathode ray tube screen, and upon the occurrence of an error exceeding the limit so defined, the present circuit operates to change the target tracking spot into the form of an annulus to indicate an "off-target" condition, simulating the "off-target" condition of an actual tracking radarscope.

Conclusion

In normal operation of the present instrument an operating voltage supply such as 110 volt A. C. is applied to the director course unit 100, to the course cam motor 150, and to a control switch circuit (described in afore-mentioned application Serial No. 225,768). With the control switch in its uncaged position, the various component units of the instrument operate and cooperate with each other. In general, tracking errors produced in the director course unit are represented by voltages carried at points A, B, and C for train tracking error and points D, E, and F for elevation tracking error, which voltages are applied to the phase sensitive detector unit generally indicated by the numeral 200, wherein the direction of train and elevation tracking errors are established by the direction of potential difference between points I and J for train tracking error and points K and L for elevation tracking error. The potential differences existing at these points are amplified in the differential amplifier 300 and are applied through points M, N, O, and P to the cathode ray beam deflecting plates, 411 and 411a for train tracking error, and 412 and 412a for elevation tracking error. The potential differences thus established on the cathode ray beam deflecting plates cause a corresponding deflection of the cathode ray beam or the target tracking spot on the cathode ray tube screen, to indicate the direction and magnitude of the combined train and elevation tracking error. The trainee attempts to follow the imaginary target course by correcting the tracking error thus indicated through proper manipulation of the train and elevation director rotor control dials, or the like. Simultaneously with the above-described operation of the tracking circuit, the jitter generator 500 operates to apply a varying and vibrating potential difference between corresponding beam deflecting plates of the cathode ray tube, thus impressing a small wander motion on the target tracking spot and superimposing a jitter action upon said wander motion. Also, the scoring system 700 functions to define an area on the cathode ray tube screen, substantially in the form of a regular octagon about the null point or zero tracking error position of the target tracking spot. So long as the potential at points M, N, O, and P are not large enough to cause the target tracking spot to pass beyond the limit so defined, the scoring clock switch (described in application Serial No. 225,768) remains closed to energize the scoring clock (described in application Serial No. 225,768) and indicate accurate target tracking. In addition, an "on-target" area is defined on the cathode ray tube screen substantially in the form of a square, defining an area extending beyond that established by the scoring system. So long as the amplified voltages carried at points R, S, T, and U are not sufficient to carry the target tracking spot outside this "on-target" area, the tracking circuit operates in its normal target tracking manner, although the error may be great enough to deenergize the scoring clock. If the tracking error exceeds the "on-target" area and the tracking is "off-target," a low impedance spot returner unit 600 substantially takes over control of the cathode ray beam deflecting plates in place of the high impedance tracking circuit, causing the target tracking spot to assume the shape of an annulus and to wander generally toward the center of the cathode ray tube screen as the continued action of the course cam motor causes the error to increase. To reestablish an "on-target" condition the manual caging switch (described in application Serial No. 225,768) is closed, operating to cage the therein described control switch. This action results in deenergizing the jitter generator 500, relieving the tracking circuit of the effect of the spot returner, eliminating the tracking error signal damping portion of the amplifier input bridges 240 and 241, opening the scoring clock circuit, and deenergizing the course cam motor, thereby enabling the trainee, by proper manipulation of the train and elevation director rotor control dials, to reestablish an "on-target" position of the target tracking spot on the cathode ray tube screen. Whereupon, the caging switch is opened and tracking may be continued by the normal operation of the instrument as described above. Thus, the present instrument provides a simulation of the actual conditions of radar tracking with a train-elevation radarscope as used with gun directors and enables the training of personnel in the art of accurate radar tracking.

A suggested set of values and types for the various components of the several units comprising the present instrument are indicated on the drawings, and an operative set of voltage supplies therefor are B+(1) 300 volts and B−(1) −300 volts. However, it is not intended to limit the scope of the present invention to the values and characteristics thus indicated, nor to the precise embodiment herein described, but modifications of this invention within the spirit and scope thereof, as defined by the appended claim, will be apparent to those skilled in the art and are within the contemplation of the present patent.

What is claimed is:

A differential amplifier comprising a twin triode vacuum tube having a first triode section and a second triode section, each triode section having a cathode, a control grid and a plate, a source of plate B+ voltage, a first and a second section plate resistor, each plate resistor being of the order of 500,000 ohms, each plate resistor having a first end tied to its respective section plate, the other ends of the plate resistors being electrically joined, a common plate load resistor disposed between the junction of the plate resistors and the B+ voltage source, the cathodes of the sections being electrically joined together and grounded through a source of B− voltage, a resistor of the order of 500,000 ohms disposed between said B− source and the joined cathodes, a first and a second grid resistor of the order of 5 megohms tied together and to the joined cathodes at one end and connected to the control grids of the first and second sections, respectively, at their other respective ends, a capacitor of the order of 0.01 microfarad disposed in parallel with each of said last-named resistors, thereby providing negligible loading of stages prior to the triode input while establishing the cathodes of the triodes at ground potential and at a positive potential with respect to the control grids and establishing the triodes with desired cathode to plate electron current flow, output means disposed at the respective triode plates, differential amplifier input means to receive intermittent pulsating D. C. error signals corresponding to command information for bearing shift, an input filter connected to each input means for smoothing the input to a substantially steady D. C. potential, one of said filters comprising a first resistor of the order of 2 megohms and a capacitor in series disposed between its respective input means and ground, the other filter comprising a second resistor of the order of 2 megohms and a capacitor in series disposed between its respective input means and ground, a third and a fourth resistor of the order of 2 megohms each disposed between the junction of each filter resistor and capacitor and its respective section control grid, a switching means, and a resistor of the order of 0.8 megohm and capacitors of the order of 2 microfarads and 0.5 microfarad selectively connected to the 0.8 megohm resistor in respective switch closed positions disposed across said differential amplifier input means for damping variations in potential difference between said input means to stimulate target automatic lead.

References Cited in the file of this patent

UNITED STATES PATENTS

| | | |
|---|---|---|
| 1,727,388 | Affel | Sept. 10, 1929 |
| 1,757,467 | Moser | May 6, 1930 |
| 2,323,128 | Hare | June 29, 1943 |
| 2,418,284 | Winchel et al. | Apr. 1, 1947 |
| 2,510,347 | Perkins | June 6, 1950 |
| 2,594,456 | Hornfeck et al. | Apr. 29, 1952 |